Figure 1:
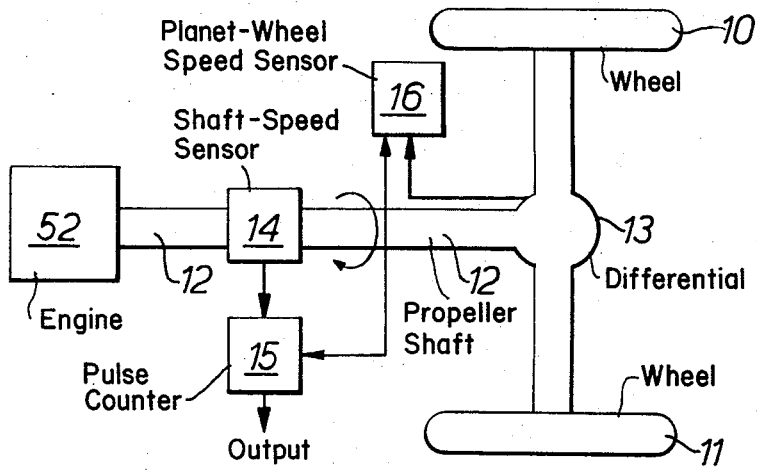

United States Patent [19]
Anderson

[11] 3,871,235
[45] Mar. 18, 1975

[54] DISTANCE OR SPEED MEASURING APPARATUS FOR LAND-VEHICLES

[75] Inventor: Edward William Anderson, Cheltenham, England

[73] Assignee: Smiths Industries Limited, London, England

[22] Filed: June 12, 1972

[21] Appl. No.: 261,755

Related U.S. Application Data

[63] Continuation of Ser. No. 49,136, June 23, 1970, abandoned.

[30] Foreign Application Priority Data
June 27, 1969 Great Britain.................... 32505/69

[52] U.S. Cl. ................................................ 73/510
[51] Int. Cl. ........................... G01p 3/04, G01p 3/56
[58] Field of Search .......... 73/488, 507, 510; 74/12; 180/1, 82, 105; 303/21

[56] References Cited
UNITED STATES PATENTS

| | | | |
|---|---|---|---|
| 3,224,278 | 12/1965 | Reid et al. .............................. | 73/510 |
| 3,288,232 | 11/1966 | Sheperd.................................. | 180/1 |
| 3,422,684 | 11/1969 | Powell ................................... | 23/519 |
| 3,622,973 | 11/1971 | Domann ................................ | 340/52 |

FOREIGN PATENTS OR APPLICATIONS

| | | | |
|---|---|---|---|
| 1,070,934 | 12/1959 | Germany .............................. | 180/82 |

*Primary Examiner*—Herbert Goldstein
*Attorney, Agent, or Firm*—Pollock, Philpitt & Vande Sande

[57] ABSTRACT

A representation of the distance travelled by, or the speed of, a wheeled-vehicle and compensated for wheel-slip, is provided from signals derived in accordance with the speeds respectively of two driven wheels of the vehicle. Difference between the two signals arising from slip is detected to derive a difference signal that is subtracted from the sum of the two signals so as to derive thereby an output in accordance with the speed of the slower, non-slipping, wheel. Alternatively, the difference signal controls switches that supply the two signals to an adder to cause both to supply the slower-wheel signal to the adder when a predetermined threshold value of the speed-difference signal is detected. The sense of the speed-difference signal may instead be used to control selection for direct use of whichever of the two wheel-speed signals is representative of the slower wheel. The two speed signals may be in the form of mechanical or electrical manifestations and in the latter case may be of pulse form supplied to respective switching inputs of a bistable device to produce an output pulse train in accordance with the lower pulse frequency. Where two wheels are driven from a common drive-shaft through a differential, detected rotation of the planet wheels of the differential (arising from slip of one driven wheel relative to the other) may be used to reduce the engine speed so as to eliminate slip and ensure correct reading of speed or distance directly from the drive-shaft rotation.

7 Claims, 7 Drawing Figures

EDWARD WILLIAM ANDERSON — Inventor

Hall, Pollock & Vande Sande — Attorneys

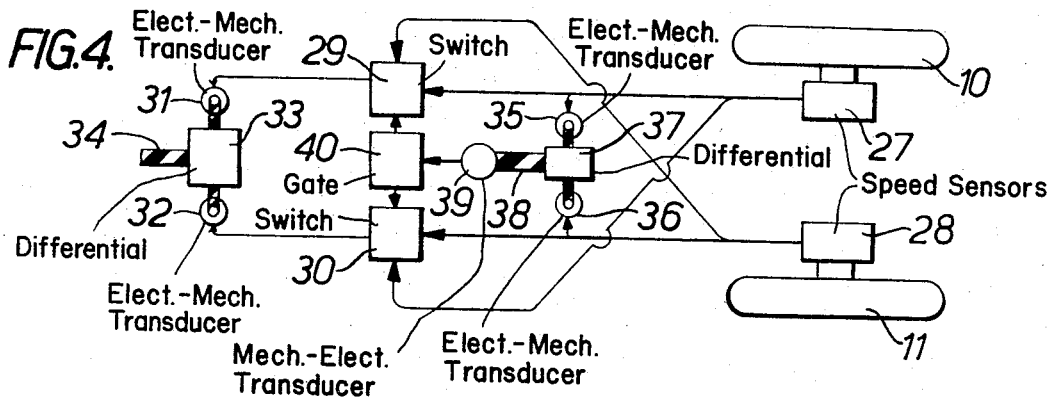
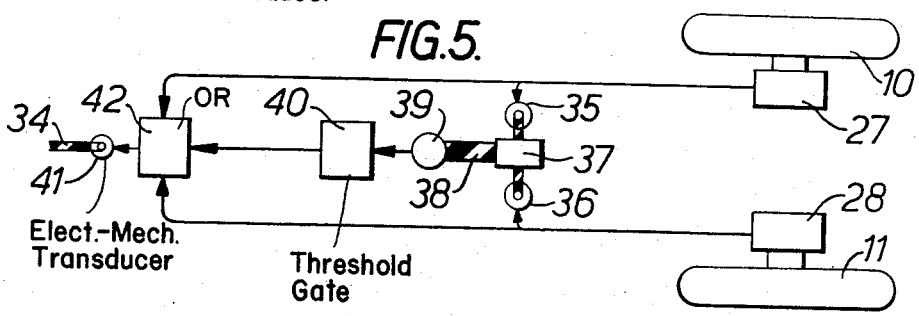
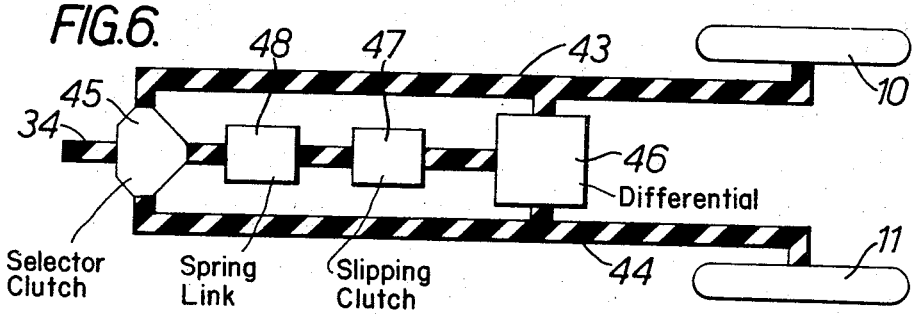
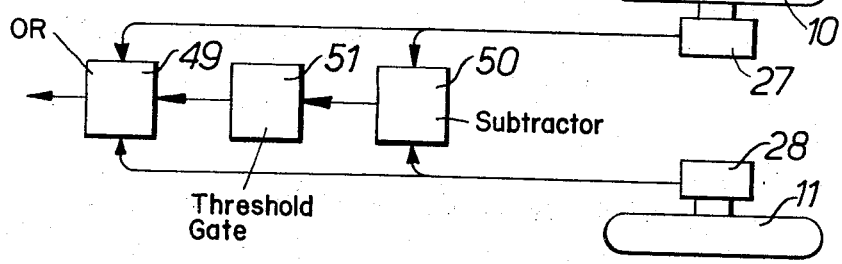

DISTANCE OR SPEED MEASURING APPARATUS FOR LAND-VEHICLES

This is a continuation of application Ser. No. 49,136, filed June 23, 1970, now abandoned.

This invention relates to distance or speed measuring apparatus for land-vehicles. In particular the invention relates to distance or speed measuring apparatus for land-vehicles of the kind in which the measurement of distance or speed is made in accordance with the driving of traction members (for example, wheels) of the vehicle, and is concerned with reducing errors that arise in such measurement from slip of these traction members. Measurement of the distance travelled by, or the speed of, a land-vehicle will hereinafter be referred to as measurement of the "movement" of the land-vehicle.

The measurement of the distance travelled by, or the speed of, a wheeled land-vehicle is usually derived by sensing the speed of rotation of a propeller shaft coupled to the driven wheels. This measurement is accurate only when no slip occurs. When slip occurs the speed of rotation of the propeller shaft may increase and cause the apparatus to provide a measurement of distance or speed in excess of the actual value. This error in measurement may be considerable when the vehicle is being driven over muddy terrain or up a slippery slope.

According to a first aspect of the present invention there is provided apparatus for providing a representation of the distance travelled by, or the speed of, a land-vehicle, comprising first means adapted to be coupled to the vehicle in such a manner as to provide signals that vary in dependence upon the speeds of a pair of driven traction members of the vehicle, and second means that is arranged to respond to said signals to derive said representation compensated for slip of either traction member in accordance with difference in said speeds.

According to a second aspect of the present invention there is provided apparatus for providing a representation of the distance travelled by, or the speed of, a land-vehicle, comprising first means for providing a first signal representative of the speed of drive applied from a common source to a pair of traction members of the vehicle, and to provide a second signal dependent on any difference in speed between the pair of driven traction members arising from slip of either of them, and second means for providing said representation in accordance with said first signal and compensated for slip in accordance with said second signal.

According to a third aspect of the present invention there is provided apparatus for providing a representation of the distance travelled by, or the speed of, a land-vehicle, comprising first means for providing first and second signals dependent on the speeds of different driven traction members of the vehicle, and second means for providing said representation in accordance with the speed of at least one of the traction members, said second means being arranged to respond to difference between the first and second signals to provide compensation in said representation for slip of either of said traction members.

Various forms of distance measuring apparatus according to the invention will now be described, by way of example, having reference to the accompanying drawings which show, diagrammatically, seven forms of the distance measuring apparatus.

Referring to FIG. 1, a wheeled vehicle includes a pair of wheels 10 and 11 which are driven from a propeller shaft 12 through a differential 13. In order to measure the distance travelled by the vehicle, a sensor 14 is provided to detect the speed of rotation of the propeller shaft 12 and to supply an output electric pulse for each revolution of the drive shaft. The sensor 14 may be of any suitable type. The output electric pulses of the sensor 14 are counted in a pulse counter 15 which provides an output electric signal representative of the number of revolutions of the propeller shaft 12.

In ideal conditions the number of revolutions of the wheels 10 and 11, and hence the number of revolutions of the drive shaft 12, is proportional to the distance travelled by the vehicle. In such a case the output electric signal of the pulse counter 15 is then proportional to the distance travelled by the vehicle. However, if one of wheels 10 and 11 slip, the speed of rotation of the propeller shaft 12 increases. The increased speed of rotation of the propeller shaft 12 will result in the distance, as indicated by the output electric signal of the pulse counter 15, being greater than the actual distance travelled by the vehicle. This error may be considerable when the vehicle is travelling over a surface where excessive slip is likely to occur, for example, a muddy terrain or a slippery slope.

When one wheel, say 10, starts to slip, the differential 13 automatically functions to reduce the torque on the wheel 11 and thereby reduce the tendency of that wheel to spin. At the same time the planet wheels (not shown) in the differential 13 will start to rotate about their rotational axes as well as continuing to rotate about the rotational axis of the wheels 10 and 11.

The speed of planet wheel rotation about their own rotational axes varies in dependence upon the degree of slip and this is used in accordance with about their own the present invention to eliminate the error in distance measurement resulting from slip. To this end, the speed of rotation of the planet wheels about their own rotational axis is sensed by a sensor 16 which supplies an output electric pulse for each such revolution of the planet wheels. These electric pulses are fed to a controller 17 arranged to control the engine and/or gear-box of the vehicle in dependence upon the repetition frequency of the electric pulses appropriately to decrease the speed of rotation of the propeller shaft 12 to eliminate the error in distance measurement due to the slip. The engine and gear-box of the vehicle is represented by the block 52.

The speed of rotation of the propeller shaft 12 is thus varied in accordance with wheel slip so that the speed of rotation of the propeller shaft 12 varies in accordance with whichever of the wheels 10 and 11 is rotating at the slower speed. The output electrical signal of the pulse counter 15 is thus representative of the speed of the slower wheel.

The wheels 10 and 11 will rotate at different speeds whenever the vehicle turns. It is desirable that this should not result in a reduction of the speed of rotation of the propeller shaft 12, otherwise the distance measuring apparatus will measure only the distance travelled by the inner wheel during each turn instead of the distance travelled by a point on the vehicle midway between the wheels 10 and 11. Accordingly, the sensor 16 includes in its output a threshold circuit which inhibits the supply of the electric pulses to the controller 17 when the speed of rotation of the planet wheels, about their own rotational axis, is equal to, or less than, a speed corresponding to the maximum speed that occurs when the vehicle turns.

The pulses supplied by the sensor 16 may, instead of being used to reduce the speed of the shaft 12, be applied to the pulse counter 15 and be used to reduce its output in accordance with the slip.

In some vehicles the planet wheels tend to be inaccessible and in these vehicles it may be difficult to detect the speed of the planet wheel rotation. In such cases an alternative form of distance measuring apparatus, according to the invention, may be used which involves deriving signals indicative of the speeds of rotation of the wheels 10 and 11. This alternative form of distance measuring apparatus may be of a number of different constructions which will now be described with reference to FIGS. 2 to 7.

Figure 2:
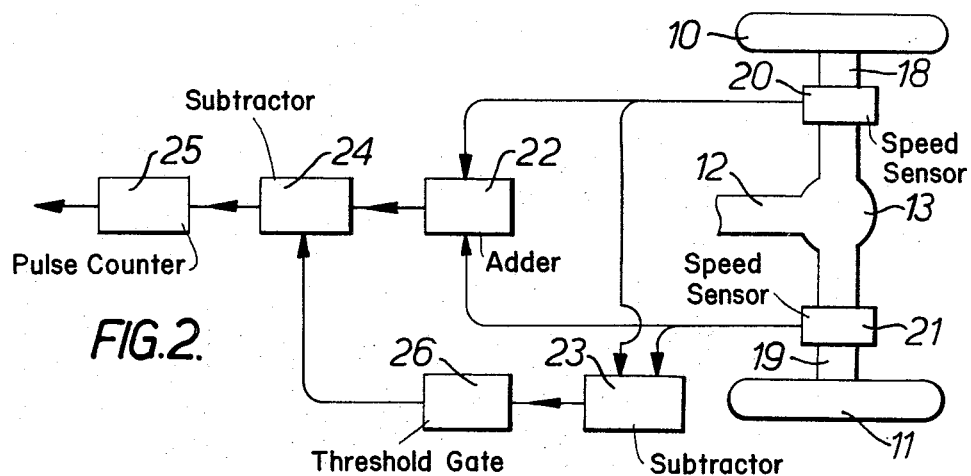

Referring to FIG. 2, the wheels 10 and 11 are coupled to the differential 13 through respective drive shafts 18 and 19. The speeds of rotation of the drive shafts 18 and 19 are detected by respective sensors 20 and 21 which are each arranged to provide an output electric pulse for each revolution of their respective drive shafts 18 and 19. The output electric pulses of the sensors 20 and 21 are added in an adder circuit 22 and subtracted from one another in a subtractor circuit 23. The output electric pulses of the adder circuit 22 are fed to a subtractor circuit 24. When the wheels 10 and 11 are rotating at the same speed the sensors 20 and 21 will provide output electric pulses at the same rate and no output electric pulses will be supplied by the subtractor circuit 23. In this case the output electric pulses of the adder 22 are fed via the subtractor circuit 24 and counted in a pulse counter 25 which thus provides an output electric signal indicative of the distance travelled by the vehicle.

However, if, say, the wheel 10 slips, the sensor 20 will provide output electric pulses at a faster rate than the detector 21. The subtractor circuit 23 will now provide output electric pulses at a rate equal to the difference in the rates of the output electric pulses from the sensors 20 and 21. The output electric pulses supplied by the subtractor circuit 23 are fed via a threshold gate 26 (whose purpose will be described hereinafter) to the subtractor circuit 24 and subtracted from the output electric pulses of the adder circuit 22 so that the rate of output electric pulses fed to the counter 25 is equal to twice the rate of output electric pulses from the sensor 21, i.e. the sensor responsive to the speed of the wheel 11. Similarly, if the wheel 11 slips the rate of output electric pulses fed to the pulse counter 25 will be equal to twice the rate of output electric pulses from the sensor 20, i.e. the sensor responsive to the speed of the wheel 10. Thus, when slip occurs the rate of output electric pulses from the subtracting circuit 24 is dependent on the rate of output electric pulses from the sensor responsive to the wheel that is rotating at the slower speed.

The threshold gate 26 is provided to detect the rate of the output electric pulses of the subtractor circuit 23 and to allow these pulses to be fed to the subtractor circuit 24 only when the pulse-rate is in excess of the maximum pulse-rate that occurs when the vehicle turns. Alternatively, threshold gate 26 may be replaced by a further subtractor circuit that is arranged to subtract electric pulses from any output electric pulses of the subtractor circuit 23 at a rate dependent on the maximum pulse-rate of these output electric pulses that would occur when the vehicle turns. Although this would result in the output electric signal of the counter 25 being indicative of a distance that is longer than the actual distance travelled by the vehicle it is visualised that this error would be small.

The adder circuit 22 may be replaced by a sensor which senses the speed of rotation of the propeller shaft 12 and provides an output electric pulse for each revolution of the propeller shaft 12. The propeller shaft 12 may rotate at more than twice the sum of the speeds of the drive shafts 18 and 19 and, in such a case, it will be necessary either to increase appropriately the rate of any output electric pulses supplied by the subtractor circuit 23 or to decrease appropriately the rate of the output electric pulses supplied by the sensor of the propeller shaft 12.

When a less accurate measurement of the distance travelled by the vehicle is acceptable, it may not be necessary to compensate for turning of the vehicle. In such a case the threshold gate 26 may be dispensed with. Alternatively, the distance measuring apparatus may be as shown in FIG. 3.

Figure 3:
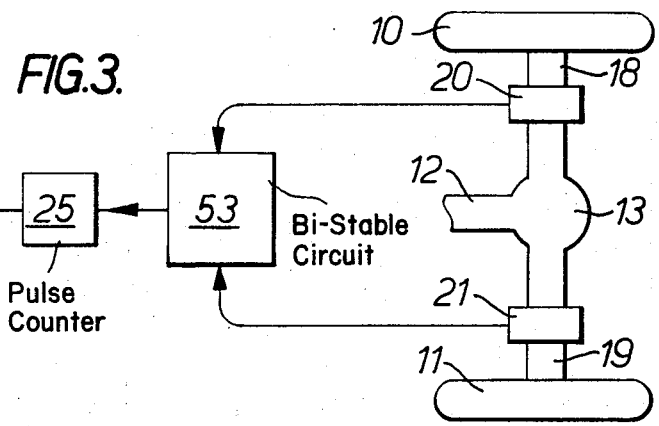

Referring to FIG. 3, the distance measuring apparatus includes a bi-stable circuit 53 having one input to which the output electric pulses of the sensor 20 are applied and another input to which the output electric pulses of the sensor 21 are applied. The bi-stable circuit 53 is arranged so that it is switchable to one of its states by each output electric pulse of the sensor 20 and switchable to the other of its states by each output electric pulse of the sensor 21. Thus, whenever slip occurs, the rate at which the bi-stable circuit 53 is switched will always be equal to the output pulse-rate of whichever of the sensors 20 and 21 is at that time sensing the speed of the slower wheel.

When the vehicle uses synchronous transmission the distance measuring apparatus may be of the type shown in either FIG. 2 or FIG. 3. Alternatively the distance measuring apparatus could in such a case be as shown in FIG. 4.

Referring to FIG. 4, the speeds of the wheels 10 and 11 are sensed by respective sensors 27 and 28 that provide output electric signals having characteristics that vary in accordance with the speeds of their respective wheels 10 and 11. The output electric signals of the sensors 27 and 28 are each fed to a pair of two-way switches 29 and 30. The output terminals of the switches 29 and 30 are connected to respective electromechanical transducers 31 and 32 which control the operation of a differential 33 and hence the speed of rotation of an output shaft 34 in accordance with the said characteristics of the electric signals applied to the transducers 31 and 32.

When no slip occurs, the switches 29 and 30 are so operated that the output electric signals of the sensors 27 and 28 are fed to the transducers 31 and 32 respectively. The operation of the differential 33 is thus controlled by the output electric signals of both of the sensors 27 and 28 so that the speed of rotation of the output shaft 34 is proportional to the sum of the speeds of rotation of the wheels 10 and 11 and hence proportional to the speed of the vehicle. A counter (not shown) is coupled to the output shaft 34 to count the number of revolutions of the output shaft 34 and provide an output signal indicative of the distance travelled by the vehicle.

The distance measuring apparatus of FIG. 4 also includes a pair of electromechanical transducers 35 and 36 to which are applied the output electric signals of, respectively, the sensors 27 and 28. The outputs of the transducers 35 and 36 are mechanically coupled to a differential 37 having an output shaft 38; the differential 37 being arranged to rotate the output shaft 38 at a speed that is dependent on any difference in the outputs of the transducers 35 and 36, and hence on any difference in the speeds of the wheels 10 and 11, and to rotate the output shaft 38 in a direction that is dependent upon which of the wheels 10 and 11 is rotating at the faster speed. The shaft 38 is coupled to an electromechanical transducer 39 which provides an output electric signal whose polarity is dependent on the direction of rotation of the shaft 38 and whose amplitude is dependent on the speed of rotation of the shaft 38. The output signal of the transducer 39 is fed to a threshold gate 40 that is operative to control the operation of the switches 29 and 30 when the amplitude of the signal from the transducer 39 is indicative of slip. In such a case, when the wheel 10 is rotating at the faster speed, the switch 29 is operated by the threshold gate 40 to connect to the transducer 31 the output of the sensor 28 instead of the output of the sensor 27. Similarly when the wheel 11 slips, the switch 30 is operated by the threshold gate 40 to connect to the transducer 32 the output of the sensor 27 instead of the output of the sensor 28.

The distance measuring apparatus of FIG. 4 may be completely mechanical. This is achieved by replacing the switches 29 and 30 with clutches and providing mechanical drives between the wheels 10 and 11 and the inputs of the clutches and further mechanical drives between the outputs of the clutches and the differential 33. The transducer 39 and the threshold gate 40 are replaced by a slipping clutch and spring loaded link mechanism of any convenient form for controlling the clutches in dependence upon both the speed and direction of rotation of the shaft 38 so as appropriately to mechanically couple the wheels 10 and 11 to the differential 33.

The distance measuring apparatus of FIG. 4 can be simplified if only one of the sensors 27 and 28 is coupled to the output shaft at any one time. Such a distance measuring apparatus is shown in FIG. 5.

Referring to FIG. 5, the output electric signals of the sensors 27 and 28 are fed directly to an OR gate 42 that is controlled by an output electric signal of the threshold gate 40 so as to connect the output electric signal of either the sensor 27 or the sensor 28 to an electromechanical transducer 41 whose output is coupled to the shaft 34. The OR gate 42 is controlled by the threshold gate 40 so that whenever one of the wheels 10 and 11 slips, the transducer 41 receives the output electric signal of the sensor that is sensing the speed of the slower wheel.

A wholly mechanical arrangement of the distance measuring apparatus of FIG. 5 is shown in FIG. 6. In this arrangement the wheels 10 and 11 are coupled by mechanical drives 43 and 44 respectively to the output shaft 34 through a selector clutch 45. The wheels 10 and 11 are also coupled by the mechanical drives 43 and 44 to a differential 46 which is, in turn, mechanically coupled to the selector clutch 45 through a slipping clutch 47 and a spring loaded link 48. In operation only one of the wheels 10 and 11 is coupled to the output shaft 34 at any one time. The differential 46 is used to detect when slip occurs, and the slipping clutch 47 and the spring loaded link 48 are arranged to control the operation of the clutch 45 so that the output shaft 34 is coupled to the wheel that is rotating at the slower speed.

An electrical pulse arrangement of the distance measuring apparatus of FIGS. 5 and 6 is shown in FIG. 7. In this arrangement the sensors 27 and 28 provide pulse outputs which are fed to both an OR gate 49 and to a subtractor circuit 50. The output of the subtractor circuit 50 is connected through a threshold gate 51 to the OR gate 49 to control the operation of the OR gate 49 so that when one of the wheels 10 and 11 slips the input of the OR gate 49 is connected to the sensor whose respective wheel is rotating at the slower speed. A pulse counter (not shown) is connected to the output of the OR gate 49.

It will usually be necessary to compensate for slip when the vehicle is reversing. In some of the distance measuring apparatus described previously this will necessitate minor alterations being carried out to the apparatus during reverse. For example, during reverse, the operation of the threshold gate 40 (FIG. 4) would have to be reversed. The minor alterations can be readily accomplished by providing a switch (not shown) that is closed when the reverse gear is engaged. This switch, when closed, is arranged to operate a relay having contacts appropriately connected in the distance measuring apparatus being used.

The forms of distance measuring apparatus described may readily be modified to measure the speed of the wheeled vehicle. In the arrangements described with reference to FIGS. 1 to 3 and FIG. 7 this is achieved by replacing the pulse counter 15 (FIG. 1), the pulse counters 25 (FIGS. 2 and 3), and the pulse counter described with reference to FIG. 7, with devices responsive to pulse repetition frequency. Similarly in the arrangements of FIGS. 4 to 6 the modification is effected by coupling, to the output shafts 34, devices responsive to the speeds of rotation of the output shafts 34.

Although numerous forms of distance or speed measuring apparatus have been described it is visualised that various other forms of distance or speed measuring apparatus may be used without exceeding the scope of the present invention. Furthermore, although the apparatus has been described with reference to wheeled vehicles it is visualised that the apparatus is also applicable to tanks.

I claim:

1. Apparatus for providing a representation of movement of a land-vehicle having a pair of driven traction members, comprising first means for providing first and second manifestations respectively dependent on the speeds of different driven traction members of the vehicle, second means responsive to said first and second manifestations for providing said representation in accordance with one of said manifestations, said second means comprising means responsive to a condition in which there is difference between said first and second manifestations for providing an output manifestation in accordance with whichever of said first and second manifestations is representative of the slower speed, and further means for providing said representation of vehicle movement in accordance with said output manifestation.

2. Apparatus according to claim 1, wherein said first and second manifestations are each in the form of a pulse train whose repetition frequency varies in accordance with the speed of the relevant traction member, and wherein said means responsive to a condition in which there is difference between said first and second manifestations comprises bistable means that is switchable between first and second stable states, means to apply pulses of one pulse train to the bistable means for switching it from said first state to its second state, and means to apply pulses of the other pulse train to said bistable means for switching it from said second state to the first state, so as thereby to cause the bistable means to switch at a frequency which is in accordance with whichever of the first and second manifestations has the lower pulse repetition frequency.

3. Apparatus according to claim 1, including summation means,
a pair of switch means each of which is switchable between a first state in which it supplies said first manifestation to the summation means and a second state in which it supplies said second manifestation to the summation means,
said summation means providing an output in accordance with the sum of the manifestations supplied thereto by the switch means,
means responsive to a condition in which there is difference between said first and second manifestations, and means for controlling the said switch means in response to the said condition,
said control means controlling the said switch means, in response to said condition, so that each switch means supplies to the summation means whichever of the first and second manifestations is representative of the slower-speed traction member.

4. Apparatus according to claim 1, including
switch means which is switchable between first and second states,
means connecting said switch means between said first means and said further means to supply said first manifestation to said further means as said output manifestation when said switch means is in said first state and to supply said second manifestation to said further means as said output manifestation when said switch means is in said second state,
means responsive to a condition in which there is difference between said first and second manifestations, and
means for controlling switching of said switch means between said first and second states in response to said condition to maintain said switch means in the state in which the manifestation supplied by the switch means to said further means is whichever of the first and second manifestations is representative of the slower-speed traction member.

5. Apparatus for providing an output manifestation representative of movement of a land-vehicle having a pair of driven traction members, comprising
first means for providing first and second manifestations respectively dependent on the speeds of different driven traction members of the vehicle, and
second means for providing said output manifestation in accordance with at least one of said first and second output manifestations,
said second means comprising means responsive to both of said manifestations to derive said output manifestation at least in part in accordance with the sum of said first and second manifestations, means for sensing a difference in speed between the two traction members representative of slip or either of the traction members, and means for responding to said difference to effect a reduction of said sum in accordance with said difference to relate said output manifestation to the slower-speed traction member.

6. Apparatus according to claim 5, wherein said second means further comprises means responsive to said first and second manifestations for deriving a third manifestation in accordance with a difference between said first and second manifestations representative of slip of either of the two traction members,
means for deriving a fourth manifestation representative of the sum of said first and second manifestations,
and means for deriving said representation in accordance with the difference between said third and fourth manifestations so as thereby to relate said output manifestation to the slower-speed traction member whenever there is slip of either of the traction members.

7. Apparatus for providing a manifestation representative of movement of a land-vehicle of the type having two traction members comprising, a source of motive power for driving both said traction members, and a differential for conveying drive from said source to said traction members, said differential including an input shaft coupled to said source, two output shafts that are coupled respectively to said traction members, and means rotatable in accordance with any difference between the speeds of rotation of said two output shafts, the apparatus further including:
a first speed sensor responsive to the speed of rotation of said input shaft of the differential to provide a first manifestation in accordance with said speed,
a second speed sensor responsive to rotation of said rotatable means of the differential to provide a second manifestation dependent upon the difference in speed between the two output shafts arising from slip of either of said traction members, and
output means for providing a representation of movement of the vehicle in accordance with the speed of the slower of the two traction members in the presence of said slip,
said output means being responsive to said first manifestation to provide said representation and being also responsive to said second manifestation to effect a reduction on said representation in accordance with said difference so as thereby to relate said representation to the slower-speed traction member.

* * * * *